US012579076B1

(12) United States Patent
Musoll et al.

(10) Patent No.: US 12,579,076 B1
(45) Date of Patent: *Mar. 17, 2026

(54) CXL HDM DECODING SEQUENCING FOR REDUCED AREA AND POWER CONSUMPTION

(71) Applicant: Astera Labs, Inc., Santa Clara, CA (US)

(72) Inventors: Enrique Musoll, San Jose, CA (US); Anh Thien Tran, Elk Grove, CA (US)

(73) Assignee: Astera Labs, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/779,600

(22) Filed: Jul. 22, 2024

Related U.S. Application Data

(63) Continuation of application No. 17/867,106, filed on Jul. 18, 2022, now Pat. No. 12,067,266.

(51) Int. Cl.
*G06F 12/109* (2016.01)

(52) U.S. Cl.
CPC ........ *G06F 12/109* (2013.01); *G06F 2212/65* (2013.01)

(58) Field of Classification Search
None
See application file for complete search history.

(56) References Cited

U.S. PATENT DOCUMENTS

| | | |
|---|---|---|
| 2022/0004488 A1 | 1/2022 | Paul et al. |
| 2022/0114086 A1 | 4/2022 | Clark et al. |
| 2022/0326887 A1 | 10/2022 | Caraccio et al. |
| 2023/0086222 A1 | 3/2023 | Enamandram et al. |

OTHER PUBLICATIONS

United States Patent and Trademark Office, U.S. Appl. No. 17/867,106, Non-Final Office Action dated Jan. 9, 2024.
United States Patent and Trademark Office, U.S. Appl. No. 17/867,106, Notice of Allowance dated Apr. 16, 2024.

*Primary Examiner* — Yaima Rigol
(74) *Attorney, Agent, or Firm* — Shield Intellectual Property PC; Zhichong Gu

(57) ABSTRACT

A total number V of virtual host-managed device memory (HDM) decoder configurations are generated for the same total number V of HDM memory regions attached to a non-host computing device. Each virtual HDM decoder configuration in the virtual HDM decoder configurations corresponds to a respective HDM memory region in the HDM memory regions. A proper subset of one or more virtual HDM decoder configurations is selected from among the virtual HDM decoder configurations to configure one or more physical HDM decoders of a total number P of the non-host computing device into one or more virtual HDM decoders. The one or more physical HDM decoders configured as one or more virtual HDM decoders are applied to translate a host physical address (HPA) received from a host computing device in a memory access transaction involving the host computing device and the non-host computing device.

21 Claims, 7 Drawing Sheets

108 HDM Decoding

<u>108</u> HDM Decoding

HPA

<u>302</u> HDM Sequencer

[ <u>304</u> Predictor ] [ <u>306</u> Table ]

<u>308</u> Prediction
(e.g., up to per LD-ID basis)

next   result

VC 1

VC 2

VC V

<u>204</u> HDM Decoding Control

<u>202-1</u> Physical HDM Decoder 1   Config 1

(P)

<u>202-P</u> Physical HDM Decoder P   Config P hit   DPA hit   DPA error   DPA

FIG. 3 generate virtual HDM decoder configurations  452 select a subset of the virtual HDM decoder to configure physical HDM decoders 454 apply the physical HDM decoder as configured to translate a HPA 456

CXL HDM DECODING SEQUENCING FOR REDUCED AREA AND POWER CONSUMPTION

CROSS-REFERENCE TO RELATED APPLICATIONS

This application claims benefit as a Continuation of application Ser. No. 17/867,106, filed Jul. 18, 2022, the entire contents of the aforementioned are hereby incorporated by reference as if fully set forth herein, under 35 U.S.C. § 120. The applicant hereby rescind any disclaimer of claim scope in the parent application or the prosecution history thereof and advise the USPTO that the claims in this application may be broader than any claim in the parent application.

TECHNICAL FIELD

Embodiments relate generally to computing systems, and, more specifically, to techniques for host-managed device memory (HDM) decoding in computing systems.

BACKGROUND OF THE INVENTION

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

The explosion of data and mainstreaming of specialized workloads-like artificial intelligence (AI) and machine learning (ML)—have given rise to heterogeneous computing in which graphics processing units (GPUs) and/or AI processors and/or other expanders or accelerators such as memory expanders/accelerators work side-by-side with host computing devices such as (e.g., general-purpose, etc.) central processing units or CPUs. Peripheral Component Interconnect Express (PCIe) and/or Compute Express Link (CXL) connectivity solutions can be built to enable relatively simple or complex topologies of various devices, memories, processors, servers, etc., to expand memory and accelerate workloads in a flexible, responsive and efficient way, while at the same time improving availability, bandwidth and performance.

BRIEF DESCRIPTION OF DRAWINGS

The present inventive subject matter is illustrated by way of example, and not by way of limitation, in the figures of the accompanying drawings and in which like reference numerals refer to similar elements and in which:

FIG. 2 and FIG. 3 illustrate example configurations for HDM decoding;

DETAILED DESCRIPTION OF THE INVENTION

Figure 1:
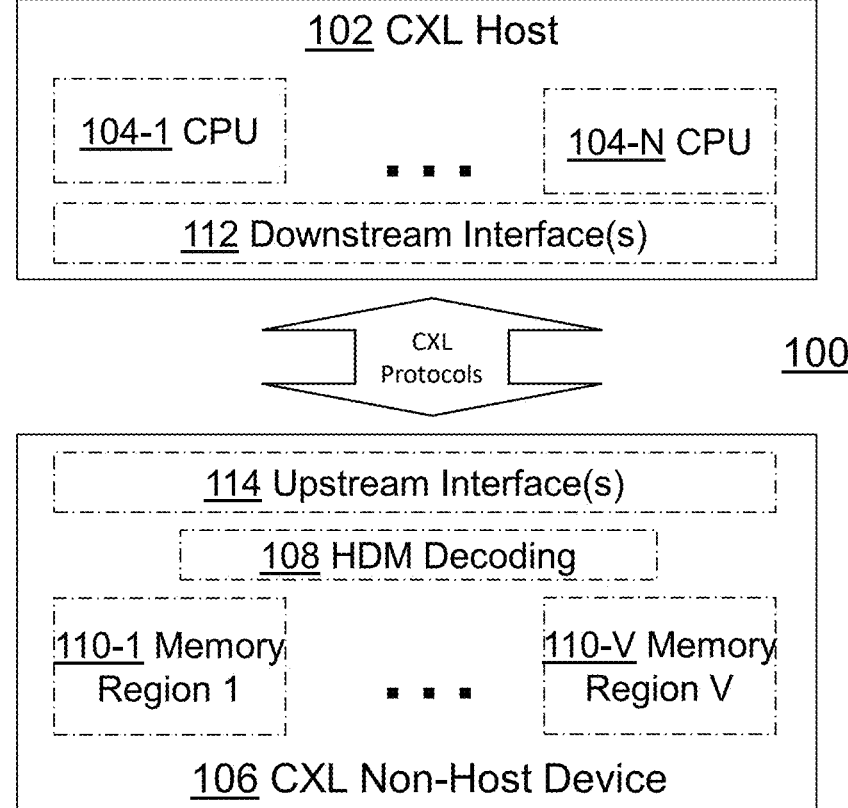
FIG. 1 illustrates an example heterogeneous computing system.

In the following description, for the purposes of explanation, numerous specific details are set forth in order to provide a thorough understanding of the present inventive subject matter. It will be apparent, however, that the present inventive subject matter may be practiced without these specific details. In other instances, well-known structures and devices are shown in block diagram form in order to avoid unnecessarily obscuring the present inventive subject matter.

Embodiments are described herein according to the following outline:

1.0 General Overview
2.0. Structural Overview
  2.1. Host Computing Device
  2.2. CPUs in the Host
  2.3. Downstream Interfaces
  2.4. Non-Host Computing Device
  2.5. Memory Regions
  2.6. HDM Decoding
  2.7. Upstream Interfaces
  2.8. Physical and Virtual HDM Decoders
  2.9. Miscellaneous
3.0. Functional Overview
  3.1. HDM Decoding
  3.2. Prediction-Based HDM Decoding
  3.3. Error Handling
  3.4. Example Process Flows
4.0. Implementation Mechanism-Hardware Overview
5.0. Extensions and Alternatives

1.0. General Overview

In CXL.mem protocols, a host physical address (HPA) in a memory access transaction from a CXL host computing device (referred to herein as "host" or "CPU") to a CXL non-host computing device (referred to herein as "device" or "endpoint") needs to be translated into a device physical address (DPA) through a CXL host-managed device memory (HDM) decoder for the purpose of accessing a memory entry corresponding to the HPA or DPA. The CXL protocols including the CXL.mem protocols, may support a variety of system or node configurations such as a fixed host and non-host configuration, an adaptive host and non-host configuration, a master-slave configuration, a peer-to-peer configuration, and so on. For example, in a peer-to-peer configuration, memory accesses or transactions thereof can be supported in a peer-to-peer configuration in which an initiator (or a requesting node/device) for a memory access or transaction thereof is represented by the host computing device (or simply "host"), whereas a recipient or (a serving or facilitating node/device) of the memory access or the transaction is represented by the non-host computing device (or simply "device"). In these peer-to-peer memory accesses, even though both link partners can be hosts or devices, the initiator act as or is represented by the host, whereas the receiver or recipient act as or is represented by the device.

The CXL host computing device may comprise, or operate with, one or more (e.g., CXL, CXL.mem, over PCIe, etc.) interfaces—communicatively coupled with one or more CXL non-host computing devices—to access and manage different HDM memory portions or regions attached to the one or more CXL non-host computing devices. The host may comprise, or operate with, one or more CPUs that communicate with these device or endpoints through CXL protocols (e.g., over PCIe, etc.) including but not limited to CXL.mem protocols.

The CXL.mem interfaces and/or the CXL non-host computing devices may be used to support plug-and-play operations for both CXL 1.1 and CXL 2.0 (and/or CXL 3.0, etc.) based solutions, enable heterogeneous mix of memory types in the same overall heterogenous computing system, and provide equivalent functionality to those implemented with (host attached) on-board main memory of the CXL host computing device.

Example CXL non-host computing devices or simply "devices" may include, but are not necessarily limited to only, any of: CXL Type-1 devices, CXL Type-2 devices, CXL Type-3 devices, memory expanders, accelerators, cards, add-in cards, Enterprise and Datacenter Small Form Factor (EDSFF) cards, etc. Example HDM (device-attached) memory portions or regions of a host computing device (or simply "host" or "CPU") may include, without limitation, a variety of memory types with the same or different characteristics and granularities.

CXL HDM decoders are needed for translating HPAs to DPAs relating to the HDM (device attached) memory portions or regions. Each of the CXL HDM decoders can be assigned and configured to generate or translate DPAs for a respective HDM (device attached) memory portion or region in the HDM portions or regions. Each of the CXL HDM decoders may be configured differently from the others of the CXL HDM decoders, for example through programmable logic implemented in a combination of software (SW), firmware or hardware (HW).

In some operational scenarios, for each CXL.mem interface used by the host to access or manage HDM portions or regions, up to 10 HDM decoders (in CXL 2.0) and up to 32 HDM decoders (in CXL 3.0) may be needed or supported. Each of the HDM decoders may have respective (hardware implemented) logic circuits such as comparators, adders, divide-by-3 operators, etc. It may be relatively costly and/or complex to implement these decoders in a device, for example in terms of costs, complexity, consumed areas or spaces, etc.

In addition, during operation, for a given HPA, even though only one specific HDM decoder in these HDM decoders is expected to "hit", in that the specific HDM decoder provides a translated DPA for a device to access its attached memory on behalf of the host, under other approaches that do not implement techniques as described herein, some or all of a relatively large multitude of HDM decoders—including the one specific HDM decoder that provides the hit—would all be invoked for translating the given HPA, resulting in numerous misses or no hits, while incurring many times unnecessary power consumptions in the heterogenous computing system.

Techniques as described herein can be implemented to support CXL HDM decoding functionality in CXL host and/or non-host computing devices up to a relatively large number of (virtual) CXL HDM decoders with relatively low costs, logic complexity, area and surface consumptions, unnecessary activities, unnecessary power consumptions, and so forth. These techniques may be used to effectuate a tradeoff between these mentioned benefits and only a relatively moderate increase in latency of HDM decoding operations.

Under these techniques, the total number of different virtual HDM decoders can be efficiently and cost-effectively scaled up with the total number of HDM memory regions to be supported. In some operational scenarios, through a memory accelerator (e.g., implemented as a computer chip or chipset on a server board, etc.) operating with a host computing device or server, the HDM memory regions can be accessed and used by the host computing device or server as a memory buffer (e.g., dynamic random access memory or DRAM, main memory, PCRAM, MRAM, ReRAM, NAND, NOR, etc.). The total number of HDM memory regions may correspond to maximum numbers of to be supported HDM memory regions as specified in technical specifications such as CXL 2.0 and/or 3.0 specifications and/or as defined in a standard or proprietary specification or system enhancement. Ease of operations can be further significantly enhanced under these techniques, as (e.g., additional, new, updated, modified, etc.) virtual HDM decoder configurations can be set up, provisioned, deployed or added in a heterogeneous computing systems or memory accelerators/expanders that are already deployed in the field.

The memory accelerator representing (or being included in) a non-host computing device (e.g., a CXL Type 2 device, a CXL Type 3 device, etc.) that mediates memory access operations or transactions between the host computing device and the non-host computing device including the memory regions can implement a relatively small total number of physical HDM decoders. Each of some or all of the physical HDM decoders can be configured with a virtual HDM decoder configuration to act or perform as any virtual HDM decoder of some or all of the relatively numerous virtual HDM decoders.

The host computing device can use different host physical addresses (HPAs) represented in a system coherent address space to access different memory regions and/or memory entries referenced by different device physical addresses (DPAs) generated by the physical HDM decoders at least in part implemented in hardware in the memory accelerator or non-host computing device configured as a subset of the virtual HDM decoders in each HDM decoding round or cycle (which may correspond to a single or multiple clock or CPU cycles).

In case that additional HDM memory regions are to be attached to the non-host computing device or the memory accelerator, additional virtual HDM decoder configurations may be configured or specified to enable the physical HDM decoders of the memory accelerator or non-host computing device to act as additional virtual HDM decoders for translating respective HPAs to corresponding DPAs used to access the newly attached additional HDM memory regions and/or memory entries (e.g., in DRAM, etc.) therein.

In some operational scenarios, the relatively small number of physical HDM decoders can be used to sequence through or visit the relatively numerous virtual HDM decoders based on a sequence or order predicted based at least in part on a to-be-translated HPA received from the host as well as on a spatial or temporal distribution of previously received HPAs for translation. A predictor used to predict a sequence or order for sequencing through the virtual HDM decoder may be trained by static or dynamic data including but not limited to static configuration (e.g., operational parameter values set based on domain knowledge, etc.), default operational parameters, dynamic configuration (e.g., changeable or adaptable operational parameters at runtime, etc.), dynamic or adaptable operational parameters based on prior hits/misses in connection with the previously received HPAs, and so forth.

The predictor may base its predictions on temporal locality indicting the reuse of specific (previously received) HPAs within a relatively small time duration as well as spatial or data locality indicating the use of relatively similar or close (previously received) HPAs. Confidence values for the predictions may be generated based at least in part on histories of hits or misses. Relatively low confidence values may be generated for predictions when the predictor is initially deployed-software or firmware implemented operations may be used to recover from prediction errors, low confidence values, etc. Confidence values may gradually increase as the predictor adapts or optimize its operational parameters (e.g., through machine learning, etc.) used to make predictions-hardware implemented operations may be used to make predictions for relatively fast responses. Additionally, optionally or alternatively, the predictor or a virtual HDM decoder sequencer can generate backup predictions along with main predictions.

By way of illustration but not limitation, based on software or firmware implemented domain knowledge or computer implemented rules, the sequencer may be configured to identify memory localities 1 and 2 are commonly or relatively frequently accessed by the host computing device while other memory localities are less common or frequent. The domain knowledge as represented in the computer implemented rules or rule sets can be used to make initial predictions, with relatively low confidence. While in operation, it may be determined that the host computing device actually access a fair number of supposedly less common memory localities, the predictor or sequencer can dynamically adapt its predictions to make more predictions toward those supposedly uncommon memory localities. When these predictions generate more and more hits, the predictor or sequencer can rely more and more on dynamically adapted operational parameters and hardware implemented logics to make predictions with relatively high confidence and relatively low latency.

The predictor or sequencer may be configured to implement different prediction strategies, process flows, methods or optimized operational parameters for different memory regions. For example, a first prediction algorithm may be implemented for a first logical device identifier corresponding to a first memory region, while a second different prediction algorithm may be implemented for a second different logical device identifier corresponding to a second different memory region. Additionally, optionally or alternatively, a (e.g., default, canonical, etc.) prediction algorithm may implement for some or all of the remaining memory regions.

Approaches, techniques, and mechanisms support memory access transactions with respect to host-managed device memory. A total number V (where V>=2) of virtual host-managed device memory (HDM) decoder configurations are generated for the same total number V of HDM memory regions attached to a non-host computing device. Each virtual HDM decoder configuration in the virtual HDM decoder configurations corresponds to a respective HDM memory region in the HDM memory regions. A proper subset of one or more virtual HDM decoder configurations is selected from among the virtual HDM decoder configurations to configure one or more physical HDM decoders of a total number P (where P<V) of the non-host computing device into one or more virtual HDM decoders. The one or more physical HDM decoders configured as one or more virtual HDM decoders are applied to translate a host physical address (HPA) received from a host computing device in a memory access transaction involving the host computing device and the non-host computing device.

In other aspects, the inventive subject matter encompasses computer apparatuses and computer-readable media configured to carry out the foregoing techniques.

2.0. Structural Overview

FIG. 1 illustrates an example heterogeneous computing system (or device) 100 in an embodiment. Heterogeneous computing system 100 comprises a (CXL) host computing device 102, a (CXL) non-host computing device 106, and so on. Some or all of the processing components described herein are implemented in central processing units (CPUs), application-specific integrated circuits (ASICs), field programmable gate arrays (FPGAs), microcontrollers, graphics processing units (GPUs), base boards, mother boards, add-in cards, EDSFF cards, line cards in a chassis, or other integrated circuit(s). Some or all of the processing components may include one or more memories storing instructions for implementing various components described herein, one or more hardware processors configured to execute the instructions stored in the one or more memories, and various data repositories in the one or more memories for storing data structures utilized and manipulated by the various components.

In various operational scenarios, the heterogeneous computing system 100 may include more or fewer processing components than illustrated in FIG. 1. For example, the heterogeneous computing system 100 may include additional computing devices or processing components with which the host computing device 102, or some or all of the CPUs 104-1 through 104-N therein, operatively communicate through CXL or non-CXL interfaces and protocols.

2.1. Host Computing Device

As illustrated in FIG. 1, a CXL host computing device 102 may include one or more CPUs 104-1 through 104-N, where N represents an integer no less than one (1). The host computing device 102 may further include one or more CXL downstream interface(s) 112; etc. In some operational scenarios, the CXL host computing device 102 may be of a different computing device type as compared with CXL non-host computing devices such as CXL accelerators, CXL memory expanders, etc.

In various operational scenarios, the host computing device 102 may include more or fewer processing components than illustrated in FIG. 1 and may be communicatively linked with additional processing components in and out of the heterogeneous computing system 100. In some operational scenarios, the host computing device 102 may be attached to or may operatively communicate with locally attached memories (e.g., dual in-line memory modules or DIMMs, etc.). The locally attached memories can be pooled among CPUs (e.g., 104-1 through 104-N, etc.) or processor cores in the host computing device 102 using CXL protocol based memory pooling operations. Additionally, optionally or alternatively, the host computing device 102 may be attached to or may operatively communicate with some or all of: solid state drives (SSD) through Non-Volatile Memory Express (NVME) interfaces; just a bunch of GPUs (JBoG) through PCIe based communications links, riser cards, network interface cards (NICs), etc.; other host computing devices through non-transparent bridges; AI processors; just a bunch of flashes (JBoF) through memory expansion devices and/or cable extender cards with re-timers and/or transceivers; spine and/or leaf switches through NICs; etc.

2.2. CPUS in the Host

The host computing device 102 may include one or more CPUs (e.g., 104-1 through 104-N) each of which may represent a processor core that can be used to access, decode and/or execute instructions of an installed or running operating system (OS) or of various system and/or user computing processes running on top of or inside the OS. The processor core may communicate with other processing components and/or local memories and/or HDM (device attached) memories to carry out operations requested or represented in the instructions. System or user data generated, processed, used or outputted by the processor core during operation may be stored, buffered, cached, read, written, updated, etc., in the memories locally attached to the host computing device 102 and/or in the HDM memories—not locally attached to the host computing device 102 but rather-attached to another computing device such as a CXL non-host device 106.

2.3. Downstream Interfaces

The host computing device 102 may include one or more (e.g., CXL, etc.) downstream interfaces 112 used by a processor core such as a CPU in the host computing device 102 to carry out (CXL) memory access transactions relating to data storing, buffering, caching, reading, updating, etc., with one or more CXL non-host computing devices such as 106 of FIG. 1. Memory access requests may be generated, communicated or made by the processor core in these memory access transactions to the CXL non-host devices via the one or more downstream interfaces 112 using CXL protocols (e.g., over PCIe, etc.). These memory access requests may include a number of data fields such as host physical addresses (HPAs) represented in a system coherent address space of the host computing device 102.

In return, the host computing device 102 or the processor core therein can receive—through the one or more downstream interfaces 112 using the CXL protocols-memory access responses in these memory access transactions from the CXL non-host devices. These responses are responsive to the memory access request made or issued by the host computing device 102 and carry or include values for a number of data fields. These memory access responses may carry first data field values to indicate whether memory access operations requested in the memory access requests have been completed by the CXL non-host devices successfully or unsuccessfully (or failed). Additionally, optionally or alternatively, these memory access responses received by the host computing device 102 may carry second data field values to provide or return any requested data items in host-managed device-attached memory entries referenced by some or all of the HPAs. These data entries may be read from or stored, buffered or cached at host-managed device-attached memory entries corresponding to some or all of the HPAs. Additionally, optionally or alternatively, these memory access responses may carry third data field values to indicate whether any, some or all of the provided or return data items referenced by some or all of the HPAs are poisoned (unreliable or invalid) through poison bits set to specific values or flags for these data items.

In some operational scenarios, at the time of making a memory access request, the host computing device 102 may set a timer to be fired after a specific length of time lapses without receiving any memory access response for the memory access request. When the timer is indeed fired, the host computing device 102 determines that a timeout event has occurred for the memory access request. The host computing device 102 may proceed to perform abort, retry, error logging, etc. The host computing device 102 may implement or perform applicable recovery process flows to recover from memory access errors such as timeouts.

2.4. Non-Host Computing Device

The non-host computing device 106 may represent a CXL accelerator, a CXL memory expander, etc. As illustrated in FIG. 1, a CXL non-host computing device 106 may include HDM decoding functionality 108, which can be implemented with IC circuits such as ASICs or FPGAs (not shown) of the non-host computing device 106. The non-host computing device 106 may also include one or more CXL upstream interface(s) 114 used to communicate with the host computing device 102. The non-host computing device 106 may further include or operate with, or may be attached with, a plurality of memory regiones 110-1 through 110-V (which may be a part of, or alternatively separate from, the CXL non-host computing device 106), where V represents an integer no less than two (2), that are (host) managed, for example under the CXL.mem protocols, by the host computing device 102. The plurality of memory regions may include some or all of the same types of memory regions. Additionally, optionally or alternatively, the plurality of memory regions may include different types of memory components (e.g., DIMMs, SSDs, flashes, non-volatile memory, volatile memory, etc.).

In various operational scenarios, the non-host computing device 106 may include more or fewer processing components than illustrated in FIG. 1 and may be communicatively linked with additional processing components in and out of the heterogeneous computing system 100.

2.5. Memory Regions

In various embodiments, memory regions as described herein may be configured—e.g., through device configuration of one or more of the heterogeneous computing system 100, the host computing device 102, the non-host computing device 106, etc.

The non-host computing device 106 may include or operate with, or may be attached with, a plurality of memory regions (e.g., 110-1 through 110-V, etc.) that are host managed device (attached) memory under the CXL.mem protocols. The plurality of memory regions (e.g., 110-1 through 110-V, etc.) may have a plurality of different sets of device physical addresses (DPAs). Each memory region in the plurality of memory regions (e.g., 110-1 through 110-V, etc.) may have a respective set of DPAs-among the plurality of different sets of DPAs—for a set of (e.g., equal size, etc) memory entries included in the memory region. A specific DPA in the respective set of DPAs for the set of memory entries in the memory device may be used by the non-host computing device 106 or memory access functionality therein to identify or reference the memory region as well as a specific memory entry in the set of memory entries in the memory region.

The plurality of sets of DPAs for the plurality of memory regions (e.g., 110-1 through 110-V, etc.) may be mapped to a plurality of (different, mutually exclusive) HPA ranges in the system coherent address space of the host computing device 102.

2.6. HDM Decoding

The non-host computing device 106 may include software (SW), hardware (HW), firmware, or a combination of one or more of the foregoing, that implements HDM decoding (functionality) 108. The HDM decoding 108 may be performed or implemented with HDM decoders.

For example, the non-host computing device 106 may include one or more hardware HDM decoders each of which may be used to implement virtual HDM decoders. The hardware HDM decoders may be implemented in hardware Each of the hardware HDM decoders may comprise (similar or same) logic circuits such as comparators, adders, divide-by-3 operators, etc.

Each of some or all of the hardware HDM decoders can be adapted under different (HDM decoding related) device configurations at different times or different (e.g., computing, clock, etc.) cycles to carry out or perform specific HDM decoding related operations for different virtual HDM decoders. The device configurations for the hardware HDM decoders may be set or configured through software and/or firmware operating in conjunction with the hardware HDM decoders.

During operation, for a given HPA received from the host computing device 102, one or more of these HDM decoders can be invoked by the non-host computing device to provide a translated DPA that identifies a specific memory region as well as a specific memory entry of the specific memory region to access.

2.7. Upstream Interfaces

The non-host computing device 106 may include one or more (e.g., CXL, etc.) upstream interfaces 114 used by a computing processor in the non-host computing device 102 to carry out (CXL) memory access transactions relating to data storing, buffering, caching, reading, updating, etc., with one or more memory regions such as 110 of FIG. 1. Memory access requests may be received by the non-host computing device 106 as a part of these memory access transactions via the one or more upstream interfaces 114 using CXL protocols (e.g., over PCIe, etc.). As noted, these memory access requests may include a number of data fields such as HPAs represented in the system coherent address space of the host computing device 102.

In response, the non-host computing device 106 may invoke the HDM decoding 108 to translate the HPAs into corresponding DPAs and/or access specific memory regions as well as specific memory entries as referenced or identified by the DPAs and/or error handling or logging if any of these translation or memory access operations encounters error or failure.

The non-host computing device 106 can generate and send-through the one or more upstream interfaces 114 using the CXL protocols-memory access responses in these memory access transactions to the host computing device 102. These responses are responsive to the memory access request made or issued by the host computing device 102 and carry or include values for a number of data fields. These memory access responses may carry first data field values to indicate whether memory access operations requested in the memory access requests have been completed by the non-host computing device 106 successfully or unsuccessfully (or failed). Additionally, optionally or alternatively, these memory access responses sent by the non-host computing device 106 may carry second data field values to provide or return any requested data items in specific memory regions and specific memory entries therein as referenced by translated DPAs corresponding to some or all of the HPAs. These data entries may be read from or stored, buffered or cached at the specific memory regions and the specific memory entries therein as referenced by the translated DPAs corresponding to some or all of the HPAs. Additionally, optionally or alternatively, these memory access responses may carry third data field values to indicate whether any, some or all of the provided or return data items referenced by some or all of the HPAs are poisoned (unreliable or invalid) through poison bits set to specific values or flags for these data items.

In some operational scenarios, in response to determining that a memory access request-received by the non-host computing device 106 from the host computing device 102-cannot be successfully carried out by the non-host computing device 106, the non-host computing device 106 may refrain from sending any memory access response for the memory access request to the host computing device 102.

2.8. Physical and Virtual HDM Decoders

Figure 2:
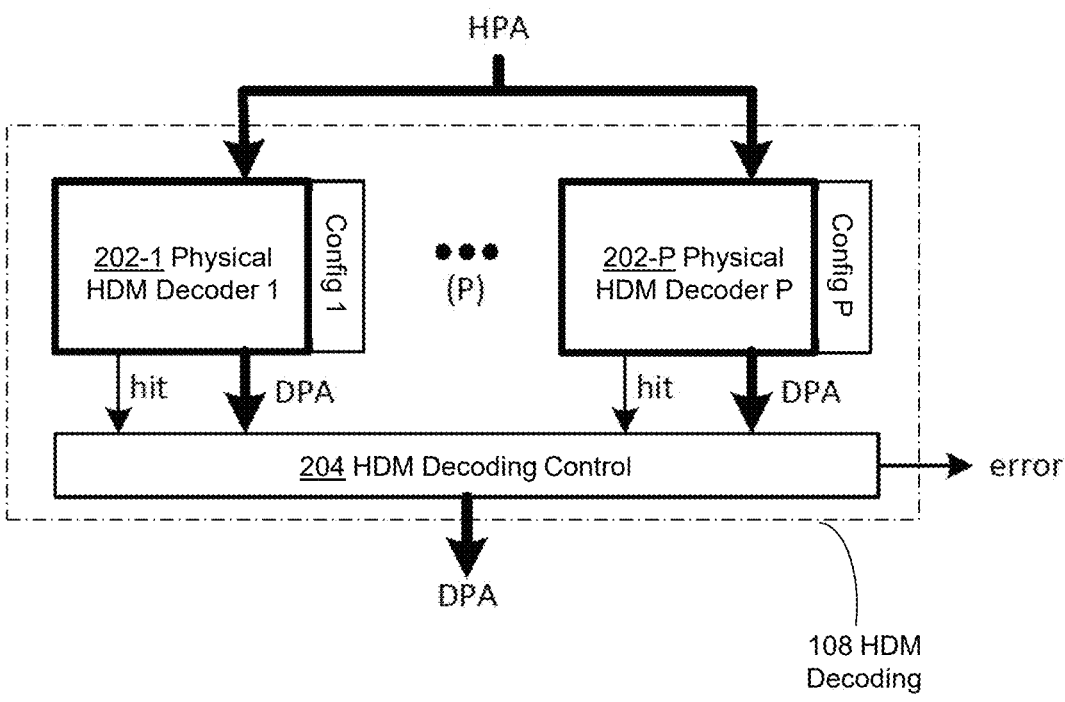

FIG. 2 illustrates an example configuration for HDM decoding (functionality) 108 in an embodiment. The HDM decoding The HDM decoding 108 may be implemented in a CXL non-host computing device such as 106 of FIG. 1 to translate HPAs received from a CXL host computing device such as 102 of FIG. 1 into corresponding DPAs that can be used to access specific memory entries of specific (host-managed or HDM) memory regions attached to the non-host computing device and carry out CXL memory access transactions in connection with the host computing device 102.

As shown, the HDM decoding 108 may include one or more physical HDM decoders (or decoder instances) 202-1 through 202-P, where P is an integer no less than one (1). Each physical HDM decoder or (decoder instance) may be physically implemented using similar or same hardware logic circuits such as comparators, adders, divide-by-3 operator(s), etc. At a decoding round or cycle (which may correspond to a single or multiple clock or CPU cycles), the HDM decoding 108 may invoke P physical HDM decoders to decode or translate an HPA received by the non-host computing device 106 from the host computing device 102.

The non-host computing device 106 may include, or may be (e.g., directly, locally, etc.) attached to a plurality of (host-managed or HDM) memory regions (e.g., 110-1 through 110-V of FIG. 1, etc.).

Under some approaches, the total number of physical HDM decoders in a non-host computing device is no fewer than (e.g., equals, etc.) the total number of (host-managed or HDM) memory regions attached to the non-host computing devices. More specifically, for each memory region in the plurality of memory regions, a respective physical HDM decoder in the HDM decoders is assigned using a fixed configuration (e.g., with fixed HDM decoding operational parameters, in "Config 1" through "Config P", etc.) to translate HPAs into DPAs. Given an HPA, all the physical HDM decoders are concurrently invoked to decode or translate the HPA. While one of the physical HDM decoders generates a hit (or produces a valid DPA), the others of the physical HDM decoders generate misses (or do not generate valid DPAs). Hence, under these approaches, the total number of the physical HDM decoders implemented in hardware and invoked during operation is relatively high, resulting in relatively high hardware and operational costs, relatively large areas, relatively high power consumptions, etc.

In contrast, under techniques as described herein, the total number of the physical HDM decoders implemented for the HDM decoding 108 in the non-host computing device 106 can be (e.g., much, significantly, eight times, four times, twice, etc.) fewer than the total number of (host-managed or HDM) memory regions attached to the non-host computing device 106.

A plurality of (e.g., V where V>=P, etc.) virtual HDM decoders may be assigned to the plurality of memory regions to decode or translate HPAs for these memory regions. The total number of virtual HDM decoders configured in a non-host computing device is no fewer than the total number of (host-managed or HDM) memory regions attached to the non-host computing devices. For each decoding round or cycle, the non-host computing device 106 or a device in the heterogenous computing system can set (physical HDM decoder) configurations "Config 1" through "Config P" of the physical HDM decoders 202-1 through 202-P to different sets of (dynamic or semi-static) HDM decoding operational parameters to cause these physical HDM decoders 202-1 through 202-P to act as (a subset of) different virtual HDM decoders in the plurality of virtual HDM decoders.

As used herein, dynamic operational parameters such as dynamic HDM decoder operational parameters in a physical HDM decoder configuration (e.g., any of "Config 1" through "Config P", etc.) may refer to those operational parameters that vary for each decoding round or cycle. Semi-static operational parameters may refer to those operational parameters that vary for every few decoding rounds or cycles but may not vary for each decoding round or cycle. Static operational parameters may refer to those operational parameters that do not vary for different decoding rounds or cycles.

By way of example but not limitation, the total number of virtual HDM decoders in a non-host computing device equals the total number of (host-managed or HDM) memory regions attached to the non-host computing devices. Each virtual HDM decoder in the plurality of virtual HDM decoders may be assigned to a respective memory region in the plurality of memory regions to decode or translate HPAs for the respective memory region.

Each physical HDM decoder in the physical HDM decoders 202-1 through 202-P may be configured via (adaptable or settable) dynamic or semi-static operational parameters in its configuration (e.g., one of "Config 1" through "Config P", etc.) as any virtual HDM decoder in the plurality of virtual HDM decoders.

FIG. 3 illustrates another example configuration for HDM decoding (functionality) 108 in an embodiment. The HDM decoding The HDM decoding 108 may be implemented in a CXL non-host computing device such as 106 of FIG. 1 to translate HPAs received from a CXL host computing device such as 102 of FIG. 1 into corresponding DPAs that can be used to access specific memory entries of specific (host-managed or HDM) memory regions attached to the non-host computing device and carry out CXL memory access transactions in connection with the host computing device 102.

As shown, the HDM decoding 108 may include one or more physical HDM decoders (or decoder instances) 202-1 through 202-P, where P is an integer no less than one (1). Each physical HDM decoder or (decoder instance) may be physically implemented using similar or same hardware logic circuits such as comparators, adders, divide-by-3 operator(s), etc. At a decoding round or cycle (which may correspond to a single or multiple clock or CPU cycles), the HDM decoding 108 may invoke P physical HDM decoders to decode or translate an HPA received by the non-host computing device 106 from the host computing device 102.

The non-host computing device 106 may include, or may be (e.g., directly, locally, etc.) attached to a plurality of (host-managed or HDM) memory regions (e.g., 110-1 through 110-V of FIG. 1, etc.).

Under techniques as described herein, the total number of the physical HDM decoders implemented for the HDM decoding 108 in the non-host computing device 106 can be (e.g., much, significantly, eight times, four times, twice, etc.) fewer than the total number of (host-managed or HDM) memory regions attached to the non-host computing device 106. In a non-limiting example, the total number of the physical HDM decoders may be two (2), while the total number of the memory regions may be eight (8).

A plurality of (e.g., V where V>=P, etc.) virtual HDM decoders may be assigned to the plurality of memory regions to decode or translate HPAs for these memory regions. The total number of virtual HDM decoders configured in a non-host computing device is no fewer than the total number of (host-managed or HDM) memory regions attached to the non-host computing devices. For each decoding round or cycle, the non-host computing device 106 or a device in the heterogenous computing system can set (physical HDM decoder) configurations "Config 1" through "Config P" of the physical HDM decoders 202-1 through 202-P to different sets of (dynamic or semi-static) HDM decoding operational parameters to cause these physical HDM decoders 202-1 through 202-P to act as (a subset of) different virtual HDM decoders in the plurality of virtual HDM decoders.

By way of example but not limitation, the total number of virtual HDM decoders in a non-host computing device equals the total number of (host-managed or HDM) memory regions attached to the non-host computing devices. Each virtual HDM decoder in the plurality of virtual HDM decoders may be assigned to a respective memory region in the plurality of memory regions to decode or translate HPAs for the respective memory region.

Each physical HDM decoder in the physical HDM decoders 202-1 through 202-P may be configured via (adaptable or settable) dynamic or semi-static operational parameters in its configuration (e.g., one of "Config 1" through "Config P", etc.) as any virtual HDM decoder in the plurality of virtual HDM decoders. For example, a plurality of virtual HDM decoder configurations denoted as "VC-1" through "VC-V" in FIG. 3 may be set up or configured for the plurality of virtual HDM decoders. Each virtual HDM decoder configuration in the plurality of virtual HDM decoder configurations "VC-1" through "VC-V" may specify respective HDM decoding operational parameters for a respective virtual HDM decoder in the plurality of virtual HDM decoders. At runtime, the HDM decoding control 204 can use HDM decoding operational parameters in a virtual HDM decoder configuration (one of "VC-1" through "VC-V") for a virtual HDM decoder in the plurality of virtual HDM decoders to set or change some or all HDM decoding operational parameters in a physical HDM decoder configuration (one of "Config 1" through "Config P") for a physical HDM decoder in the one or more physical HDM decoders 202-1 through 202-P to cause the physical HDM decoder to perform HDM decoding operations as the virtual HDM decoder.

2.9. Miscellaneous

The foregoing figures illustrate only a few examples in which the techniques described herein may be practiced. Other embodiments may include fewer and/or additional components in varying arrangements.

3.0. Functional Over View

As noted, under techniques as described herein, a relatively small total number of physical HDM decoders (e.g., 202-1 through 202-P of FIG. 2 or FIG. 3, etc.) may be used to carry out HDM decoding on behalf of a relatively large total number of (V where V>=P) virtual HDM decoders.

By way of example but not limitation, the total number of the physical HDM decoders may be two (2), while the total number of the memory regions may be eight (8). For a given HPA to be translated or decoded into a corresponding DPA, the physical HDM decoders may be used to cycle through or visit some or all of the virtual HDM decoders using a prediction based or non-prediction-based sequence (or virtual HDM decoder) selection algorithm.

In some operational scenarios, a prediction-based sequence (or virtual HDM decoder) selection algorithm may be implemented by a device (e.g., 106 of FIG. 1, etc.) or an HDM sequencer (e.g., 302 of FIG. 3, etc.) therein based at least in part on temporal locality and/or spatial locality of the HPA.

As used herein, temporal locality may refer to how close in time (along a time axis or a logical time sequence) the HPA is to one or more prior HPAs handled or processed by virtual HDM decoder(s) that generate hits (or conversely misses). A relatively high weight for selecting a virtual HDM decoder may be given or assigned to the virtual HDM if the virtual HDM has produced a relatively recent hit. A relatively low weight for selecting a virtual HDM decoder may be given or assigned to the virtual HDM if the virtual HDM has produced a relatively recent miss.

Spatial locality may refer to how spatially close, for example in the system coherent address space of the host computing device (102), the HPA is to one or more prior HPAs handled or processed by virtual HDM decoder(s) that generate hits (or conversely misses). A relatively high weight for selecting a virtual HDM decoder may be given or assigned to the virtual HDM if the virtual HDM has produced a hit for a prior HPA relatively spatially close to the given HPA. A relatively low weight for selecting a virtual HDM decoder may be given or assigned to the virtual HDM if the virtual HDM has produced a hit for a prior HPA relatively spatially far away, for example in the system coherent address space of the host computing device (102), from the given HPA.

Hence, under techniques as described herein, a virtual HDM decoder may be selected to decode the given HPA depending at least in part on how likely the virtual HDM decoder is to produce a hit for the given HPA.

This approach trades off relatively low cost and power consumption for a potentially increased latency, as the predicted or selected virtual HDM decoder may or may not actually produce or generate a hit for the given HPA.

In the present example, only two (P=2) physical HDM decoders are implemented in hardware with their respective hardware logic circuits to perform HDM decoding under their respective configurations. These two physical HDM decoders can be used to implement HDM decoding as eight (V=8) virtual HDM decoders by way of operational parameters in configurations of the virtual HDM decoders to replace, for example through hardware and/or software programming logic implemented by the HDM decoding control 204, some or all operational parameters in the configurations of the physical HDM decoders.

After a given HPA in an incoming CXL transaction is received by the non-host computing device 106 from the host computing device 102, in each (e.g., current, etc.) decoding round or cycle of an HDM decoding process performed for the given HPA, a selection algorithm is performed to select two virtual HDM decoders, which may be relatively likely to produce or generate hits according to prediction operational parameters (in effect) for a current decoding round or cycle.

Initially, when prior histories of virtual HDM decoders generating hits or misses, prior histories of HPAs and/or DPAs, etc., are not available, default prediction operational parameters may be configured—for example through hardware implemented for the HDM decoding 108 of FIG. 1—and used in the selection algorithm. Later as the prior histories become more and more available, non-default or adaptively optimized prediction operational parameters may be configured—for example through a software module implemented for the HDM decoding 108 of FIG. 1—and used in the selection algorithm.

The prediction operational parameters may be used, for example through software programming logic implemented by the HDM sequencer 302 of FIG. 3, to determine temporal locality and/or spatial locality of some or all of the virtual HDM decoders in relation to the given HPA. Additionally, optionally or alternatively, the virtual HDM decoders may be sorted by the HDM sequencer 302 based on their respective likelihoods of generating or producing hits.

If the two physical HDM decoders configured as the two virtual HDM decoders selected for the current decoding round generate a hit for the given HPA, then the HDM decoding process for the given HPA is done or ends successfully. Otherwise, the next decoding round or cycle may commence to select the next (up to) two virtual HDM decoders to be applied to the configurations of the two physical HDM decoders for the next decoding round or cycle (or the new current decoding round or cycle).

In the present example, the worst case needs to spend 4 decoding rounds in the HDM decoding process for the given HPA, while the average case may spend a relatively small number of decoding rounds in the HDM decoding process depending on how well the prediction(s) of the virtual HDM decoders are.

3.1. HDM Decoding

Figure 4A:
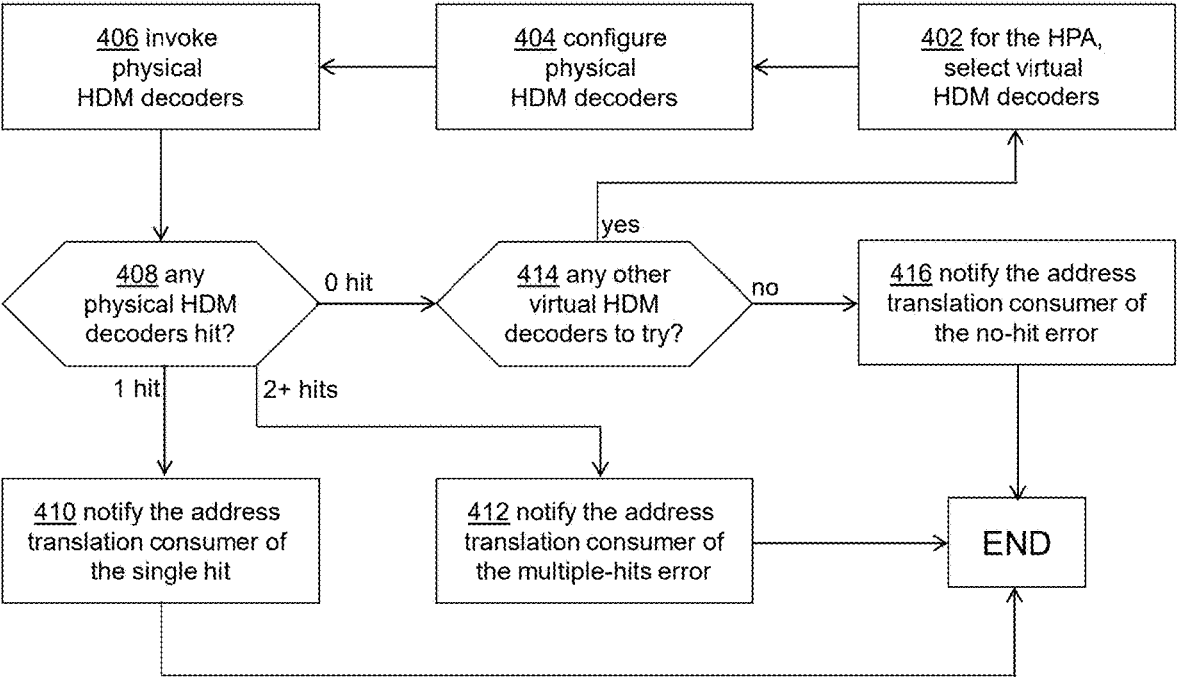
FIG. 4A through FIG. 4C illustrates example process flows.

FIG. 4A illustrates an example process flow, according to an embodiment. The various elements of the flow described below may be performed by a system or device—e.g., a heterogeneous system such as 100 of FIG. 1, a device such as a non-host computing device 106 of FIG. 1, a device operating in conjunction with the non-host computing device 106, etc.—implemented with one or more computing devices.

Block 402 comprises selecting a set or subset of the other virtual HDM decoders, from among the plurality of virtual HDM decoders, that have not performed HDM decoding operations. These (up to) P different virtual HDM decoders may be selected, by the HDM decoding 108 or a module therein, from among all virtual HDM decoders (in the plurality of virtual HDM decoders) that have not yet performed HDM decoding operations for the given HPA based on a decoder selection algorithm. This algorithm may be sequential, round-robin, adaptive, fixed, prediction based, etc. In an example, the virtual HDM decoders may be selected based on a sequential algorithm that orders the plurality of virtual HDM decoders into a specific sequence and selects a subset of the plurality of virtual HDM decoders for each decoding round or cycle based on the specific sequence. In another example, the virtual HDM decoders may be selected based on a random algorithm that generates a random order for a given HPA in the plurality of virtual HDM decoders and selects a subset of the plurality of virtual HDM decoders for each decoding round or cycle of the given HPA based on the random order.

Block 404 comprises, at each decoding round or cycle (e.g., a single clock or CPU cycle, multiple clock or CPU cycles, etc.), configuring (up to) the P different physical HDM decoders 202-1 through 202-P respectively as (up to) P different virtual HDM decoders—that have not yet performed HDM decoding operations for a given HPA—in the plurality of virtual HDM decoders with their respective dedicated configurations (denoted as "Config 1" through "Config P" in FIG. 2).

Block 406 comprises concurrently invoking the configured (up to) P different physical HDM decoders 202-1 through 202-P to perform HDM decoding operations of the given HPA as the (up to) P different virtual HDM decoders. In some operational scenarios, the process flow goes to block 408. (Additionally, optionally or alternatively, in some other operational scenarios, the process flow may go to block 414 to continue exercising all the yet to be exercised virtual HDM decoders in the plurality of virtual HDM decoders before the process goes to block 408. The process flow with such an alternative from block 406 to block 414 may be used for debugging purposes, for example. In comparison, the process flow with block 406 going to block 408 may be used in normal operations or mission mode operations.)

Block 408 comprises, at the end of the (current) decoding round or cycle, deciding, identifying or otherwise determining—e.g., by the HDM decoding 108 or an HDM decoding control module 204 or controller therein—whether any (and/or how many) of the physical HDM decoders—respectively configured as the different virtual HDM decoders in the current decoding round or cycle—has a hit (or produces a DPA for the HPA).

In response to determining that a single physical HDM decoder in the physical HDM decoders 202-1 through 202-P has a hit in the current decoding round or cycle, the process goes to block 410.

Block 410 comprises forwarding—e.g., by the HDM decoding 108 or an HDM decoding control module 204 or controller therein—the DPA from that physical HDM decoder to a designated consumer of the DPA. The process flow subsequently ends.

In response to determining that multiple physical HDM decoders in the physical HDM decoders 202-1 through 202-P have multiple hits or multiple DPAs for the same HPA in the current decoding round or cycle, the process goes to block 412.

Block 412 comprises notifying—e.g., by the HDM decoding 108 or an HDM decoding control module 204 or controller therein—the designated consumer of this error (or multiple hits). In some operational scenarios, the process flow subsequently ends.

In response to determining that no physical HDM decoder in the physical HDM decoders 202-1 through 202-P has a hit or a DPA for the HPA in the current decoding round or cycle, the process flow goes to block 414.

Block 414 comprises determining—e.g., by the HDM decoding 108 or an HDM decoding control module 204 or controller therein—whether there are other virtual HDM decoders, in the plurality of virtual HDM decoders, that have not performed HDM decoding operations by way of the physical HDM decoders 202-1 through 202-P.

In response to determining (that no physical HDM decoder in the physical HDM decoders 202-1 through 202-P has a hit or a DPA for the HPA in the current decoding round or cycle and) that there are other virtual HDM decoders, in the plurality of virtual HDM decoders, that have not performed HDM decoding operations by way of the physical HDM decoders 202-1 through 202-P, the process flow goes to block 402, which causes—e.g., by the HDM decoding 108 or an HDM decoding control module 204 or controller therein—the foregoing operations repeated for additional virtual HDM decoders in the plurality of virtual HDM decoders.

In response to determining that there are no other virtual HDM decoders, in the plurality of virtual HDM decoders, that have not performed HDM decoding operations by way of the physical HDM decoders 202-1 through 202-P, the process flow goes to block 416.

Block 416 comprises notifying—e.g., by the HDM decoding 108 or an HDM decoding control module 204 or controller therein—the designated consumer of this error (or no hit by any of the plurality of virtual HDM decoders). The process flow subsequently ends.

As used herein, a designated consumer of a DPA may refer to an entity implementing or performing device requested memory access operations with respect to a memory entry in a host-managed device (attached) memory as referenced or pointed to by the DPA.

3.2. Prediction-Based HDM Decoding

Figure 4B:
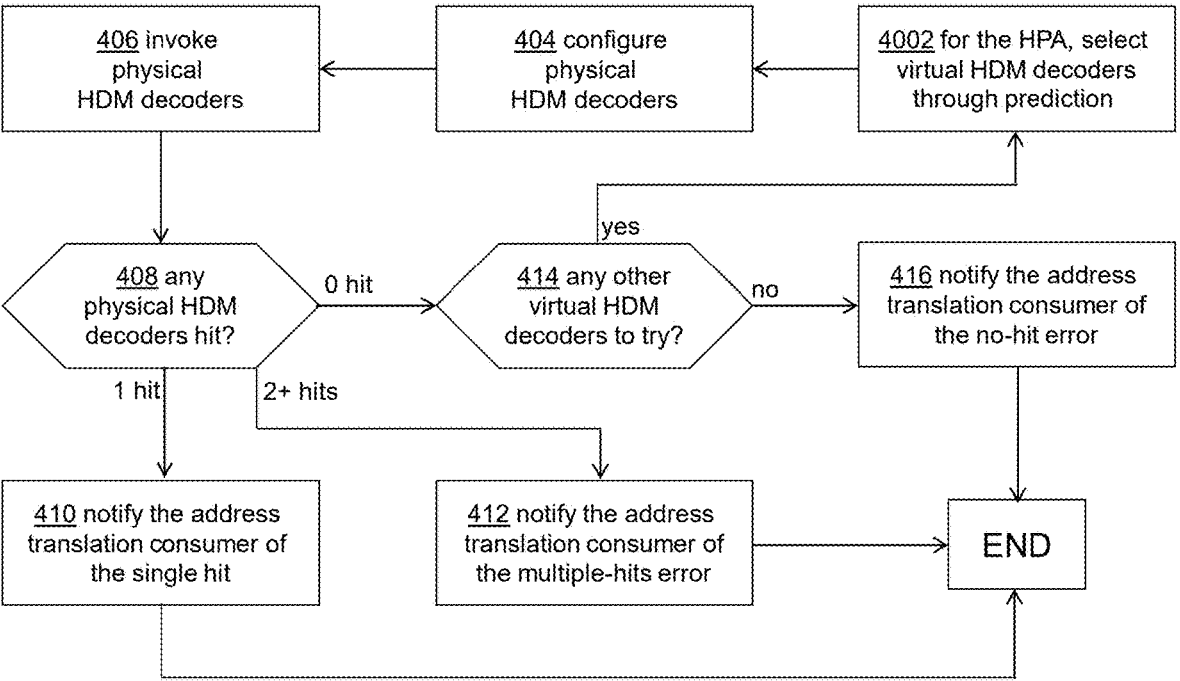

FIG. 4B illustrates an example process flow, according to an embodiment. The various elements of the flow described below may be performed by a system or device—e.g., a heterogeneous system such as 100 of FIG. 1, a device such as a non-host computing device 106 of FIG. 1, a device operating in conjunction with the non-host computing device 106, etc.—implemented with one or more computing devices.

Block 4002 comprises selecting a set or subset of the other virtual HDM decoders, from among the plurality of virtual HDM decoders, that have not performed HDM decoding operations. These (up to) P different virtual HDM decoders may be selected, by the HDM decoding 108 or a module therein, from among all virtual HDM decoders (in the plurality of virtual HDM decoders) that have not yet performed HDM decoding operations for the given HPA based on a decoder selection algorithm including but not limited to prediction based selection algorithm(s).

Block 404 comprises, at each decoding round or cycle (e.g., a single clock or CPU cycle, multiple clock or CPU cycles, etc.), configuring (up to) the P different physical HDM decoders 202-1 through 202-P respectively as (up to) P different virtual HDM decoders—that have not yet performed HDM decoding operations for a given HPA—in the plurality of virtual HDM decoders with their respective dedicated configurations (denoted as "Config 1" through "Config P" in FIG. 2).

For example, the HDM decoding 108 or an HDM Sequencer 302 therein can implement or perform a prediction based decoder selection algorithm that generates or provides a prediction 308 of a set of (up to) P virtual HDM decoders that are most likely—e.g., with the highest likelihoods or probabilities among the plurality of virtual HDM decoders—to generate hit(s) or DPA(s) for a given HPA. The prediction 308 can be generated by a predictor 304 (e.g., in the HDM sequencer 302, operating with the HDM sequencer 302, etc.) that implements the prediction based decoder selection algorithm. The algorithm or predictions generated therefrom may be controlled using prediction operational parameters maintained or stored in one or more data constructs such as table(s) 306. Some or all of the prediction operational parameters may be—initially, for one or more initial HPAs, for each time period, etc.—set to default prediction operational parameters such as a default selection algorithm, a default selection sequence, etc. Some or all of the prediction operational parameters may be adaptively, dynamically, semi-statically, etc., set to configurable prediction operational parameters derived at least in part from some or all of: (a history of) prior HDAs, (a history of) prior DPAs, (a history of) prior virtual HDM decoders generating hits or misses, (a history of) prior virtual HDM decoders generating most recent and/or highest hits, (a history of) prior virtual HDM decoders generating least recent and/or least hits, a temporal distribution of prior HDAs along a time axis, a spatial distribution of prior HDAs in the system coherent address space, a temporal distribution of prior DPAs along a time axis, a spatial distribution of prior DDAs in respective device memory address spaces, and so forth.

For the (current) decoding round or cycle, the HDM decoding control can send, to the HDM sequencer 302, a request (denoted as "next") for a prediction of the (up to) P virtual HDM decoders to selected from the plurality of virtual HDM decoders. The HDM sequencer 302 or the predictor 304 therein can generate, and provide to the HDM decoding control 204, the prediction of the (up to) P virtual HDM decoders.

In response to receiving the prediction 308 of the (up to) P different virtual HDM decoders from the HDM sequencer 302, the HDM decoding control 204 can update some or all HDM decoding operational parameters in the (up to) P different physical HDM decoder configurations for the (up to) P different physical HDM decoders with respective HDM decoding operational parameters in the (up to) P different virtual HDM decoder configurations for the (up to) P different virtual HDM decoders.

Block 406 comprises concurrently invoking the configured (up to) P different physical HDM decoders 202-1 through 202-P to perform HDM decoding operations of the given HPA as the (up to) P different virtual HDM decoders. In some operational scenarios, the process flow goes to block 408. (Additionally, optionally or alternatively, in some other operational scenarios, the process flow may go to block 414 to continue exercising all the yet to be exercised virtual HDM decoders in the plurality of virtual HDM decoders before the process goes to block 408.)

Block 408 comprises, at the end of the (current) decoding round or cycle, deciding, identifying or otherwise determining—e.g., by the HDM decoding 108 or an HDM decoding control module 204 or controller therein—whether any (and/or how many) of the physical HDM decoders—respectively configured as the different virtual HDM decoders in the current decoding round or cycle—has a hit (or produces a DPA for the HPA).

In response to determining that a single physical HDM decoder in the physical HDM decoders 202-1 through 202-P has a hit in the current decoding round or cycle, the process goes to block 410.

Block 410 comprises forwarding—e.g., by the HDM decoding 108 or an HDM decoding control module 204 or controller therein—the DPA from that physical HDM decoder to a designated consumer of the DPA. The process flow subsequently ends.

In response to determining that multiple physical HDM decoders in the physical HDM decoders 202-1 through 202-P have multiple hits or multiple DPAs for the same HPA in the current decoding round or cycle, the process goes to block 412.

Block 412 comprises notifying—e.g., by the HDM decoding 108 or an HDM decoding control module 204 or controller therein—the designated consumer of this error (or multiple hits). In some operational scenarios, the process flow subsequently ends.

In response to determining that no physical HDM decoder in the physical HDM decoders 202-1 through 202-P has a hit or a DPA for the HPA in the current decoding round or cycle, the process flow goes to block 414.

Block 414 comprises determining—e.g., by the HDM decoding 108 or an HDM decoding control module 204 or controller therein—whether there are other virtual HDM decoders, in the plurality of virtual HDM decoders, that have not performed HDM decoding operations by way of the physical HDM decoders 202-1 through 202-P.

In response to determining (that no physical HDM decoder in the physical HDM decoders 202-1 through 202-P has a hit or a DPA for the HPA in the current decoding round or cycle and) that there are other virtual HDM decoders, in the plurality of virtual HDM decoders, that have not performed HDM decoding operations by way of the physical HDM decoders 202-1 through 202-P, the process flow goes to block 402, which causes—e.g., by the HDM decoding

108 or an HDM decoding control module 204 or controller therein—the foregoing operations repeated for additional virtual HDM decoders in the plurality of virtual HDM decoders.

In response to determining that there are no other virtual HDM decoders, in the plurality of virtual HDM decoders, that have not performed HDM decoding operations by way of the physical HDM decoders 202-1 through 202-P, the process flow goes to block 416.

Block 416 comprises notifying—e.g., by the HDM decoding 108 or an HDM decoding control module 204 or controller therein—the designated consumer of this error (or no hit by any of the plurality of virtual HDM decoders). The process flow subsequently ends.

This process may continue until either an HDM hit is obtained for the HPA or when all the virtual HDM decoders in the plurality of virtual HDM decoders have been visited or applied for the HPA. At the end of the process, the HDM decoding control 204 can notify the HDM Sequencer 302 of the outcome of the process (denoted "result") so that this information can be factored into (e.g., HW-maintained, SW-maintained, etc.), or can be used to further optimize, the prediction operational parameters to be applied to subsequent predictions of specific virtual HDM decoders that are most likely to generate hit(s) for subsequently received HPAs by the non-host computing device 106 from the host computing device 102.

3.3. Error Handling

In some operational scenarios, the virtual and/or physical HDM decoders are configured properly—with consistent configurations among various host or non-host computing devices and memory regions in the heterogeneous computing system 100. For example, all the virtual HDM decoders to be configured into the physical HDM decoders in one or more decoding rounds or cycles may cover mutually exclusive HPA ranges in the system coherent address space of the host computing device 102. Hence, it is expected that just one of the HDM decoders generate a hit for a (e.g., valid, given, etc.) HPA.

However, in some operational scenarios, the virtual and/or physical HDM decoders are configured improperly—with configuration inconsistency among various host or non-host computing devices and memory regions. In an example, two different virtual HDM decoders in the plurality of virtual HDM decoders may cover two HPA ranges that are at least partially overlapping. In another example, the virtual HDM decoders may not be configured properly to cover a valid HPA or HPA range in the system coherent address space of the host computing device 102. Hence, two error situations or cases may occur: first, no hit is generated for a given HPA; second, many hits are generated for a given HPA.

Policies and error handling operations can be defined or performed for handling address translation errors in reads or writes.

The no-hit error situation or case can be discovered after all rounds of HDM decoding for the same given HPA have completed and no virtual HDM decoder has generated a hit or DPA for the given HPA. The non-host computing device 106 or the HDM decoding 108 therein can be configured (e.g., a static mode, a preconfigured operational mode, etc.) with a specific error handling strategy or process flow for this no-hit error situation or case.

In an example, the non-host computing device 106 or the HDM decoding 108 therein can be configured to drop the memory access transaction relating to the given HPA and not respond to the host computing device 102 that made the memory access request for the given HPA in the memory access transaction (e.g., a read transaction, a write transaction, a cache coherence related transaction, etc.), thereby allowing the heterogeneous computing system 100 or the host computing device 102 to recover through a timeout mechanism.

In an example, in which the memory access transaction represents a read transaction, the non-host computing device 106 or the HDM decoding 108 therein can be configured to respond default or invalid data with a poisoned flag or bit set to a specific value to indicate that there is no hit generated for the given HPA. The poison flag or indication may mean that the data returned is corrupted and should not be used by the receiver. A poison (error) flag or notification can be used or raised when an HDM decoding error occurs. The received may not be able to discern a root cause of the error from a returned message itself or flag/indication therein. The root cause can be determined by the receiver by checking status logs such as those generated in the non-host computing device for further information, which may be logged in the non-host computing device itself for debugging purposes, implementation specific, and up to the non-host computing device and/or the host computing device to decide.

In an example, in which the memory access transaction represents a write transaction, the non-host computing device 106 or the HDM decoding 108 therein can be configured to indicate statuses of the HDM decoding operation into a designated place such as a log or trace. In an example, the non-host computing device 106 may or may not send back (e.g., negative, etc.) acknowledgment(s) to the host computer device 102.

As used herein, poisoned or poison may refer to a flag, a bit, a status code that conveys, for example in accordance with an applicable CXL specification, to the receiver whether received or returned data in the memory access transaction is valid or reliable.

The many-hit error situation or case can be discovered after one or more up to all rounds of HDM decoding for the same given HPA have completed and two or more virtual HDM decoders have generated two or more hits or DPAs for the given HPA. The non-host computing device 106 or the HDM decoding 108 therein can be configured (e.g., a static mode, a preconfigured operational mode, etc.) with a second specific error handling strategy or process flow for this many-hit error situation or case.

In an example, the non-host computing device 106 or the HDM decoding 108 therein can be configured to drop the memory access transaction relating to the given HPA and not respond to the host computing device 102 that made the memory access request for the given HPA in the memory access transaction (e.g., a read transaction, a write transaction, a cache coherence related transaction, etc.), thereby allowing the heterogeneous computing system 100 or the host computing device 102 to recover through a timeout mechanism.

In an example, in which the memory access transaction represents a read transaction, the non-host computing device 106 or the HDM decoding 108 therein can be configured to respond default or invalid data or data at one (e.g., the lowest address value, etc.) of the DPAs with a poisoned flag or bit set to a specific value to indicate that there is no hit generated for the given HPA.

In an example, in which the memory access transaction represents a write transaction, the non-host computing device 106 or the HDM decoding 108 therein can be configured to write the data with poison into one (e.g., the lowest address value, etc.) of the DPAs and send back (e.g., negative, etc.) acknowledgment(s), for example in accordance with an applicable CXL specification, to the host computer device 102.

Both of these error situations or cases (or conditions) are relatively unexpected, rare events, for example caused by misconfigurations or inconsistent configurations of the virtual HDM decoders and/or memory regions. It would be costly in latency for the system (e.g., 100 of FIG. 1, etc.) or device(s) therein to try to proactively discover possible multi-hit error situation or case, as all rounds of HDM decoding exercising all virtual HDM decoders would be executed or performed, thereby increasing individual and/or collective latencies of memory access transactions significantly.

Additionally, optionally or alternatively, in some operational scenarios, the system (e.g., 100 of FIG. 1, etc.) or device(s) therein can be configured (e.g., a static mode, a preconfigured operational mode, etc.) to not pursue the many-hit error situation or case unless it happens in the same HDM decoding round. In other words, when the first hit happens for a given HPA, the HDM decoding finishes without going any additional decoding round for the same given HPA. Hence, in these operational scenarios, the many-hit error situation or case is only detected if more than one HDM decoder generate a hit or DPA in this last or just finished HDM decoding round.

On the other hand, in some operational scenarios, the system (e.g., 100 of FIG. 1, etc.) or device(s) therein can be configured (e.g., a static mode, a preconfigured operational mode, etc.) to implement full protection against any error situation or error that could arise in all possible decoding rounds for a given HPA, and in particular checks for the many-hit situation or case that could arise in up to the last possible decoding round for the given HPA. For example, this mode may be used to check or determine whether there is any issue or error with programmability and configuration when the non-host computing device is deployed in the heterogeneous computing with the host computing device after all the HDM decoding programmability and configuration have been completed, for example in an initial debug or bring-up phase. Subsequently, a mission or normal operational mode for the process flow may be used until the next configuration or reconfiguration of the virtual HDM decoders. The process flow in the mission or normal operational mode may not seek to identify all possible errors that could arise in decoding a given HPA.

It should be noted that configurations, static modes, operational modes, etc., set up in the heterogeneous computing system 100 may be set up for a specific error condition, situation or case for each of some or all memory regions attached to or in the non-host computing device 106. The same or different configurations, static modes or operational modes may be set up for the same specific error condition, situation or case for different memory regions.

A specific configuration, static mode or operational mode may be set up for the specific error condition, situation or case for each of some or all memory regions. The same or different configurations, static modes or operational modes may be set up for the same specific error condition, situation or case for different memory regions.

For reliability, availability and serviceability (RAS) purposes, some or all errors that occur may be tracked (e.g., counted, analyzed, etc.). Corresponding interrupts may be raised to cause programming logics in software, firmware, hardware, etc., running or installed with the heterogeneous computing system 100 or device(s) therein to take applicable actions for the errors. Additionally, optionally or alternatively, incoming transactions that caused some or all of the errors may be logged or tracked.

In some operational scenarios, system or device configurations may be implemented or set up with the HDM decoding 108 to (e.g., completely, etc.) bypassing HPA decoding (e.g., performed by the physical HDM decoding, etc.) for certain HPAs and/or for certain memory regions. For example, translated DPAs can be obtained from these HPAs physical device address by simply adjusting the HPAs by an (applicable) offset.

The system or device configurations may specify for which HPAs and/or for which memory regions HDM decoding (e.g., performed by the physical HDM decoders, etc.) can be bypassed or not. Additionally, optionally or alternatively, the offset used for adjusting the HPAs when the HDM decoding is bypassed can also be specified in the system or device configurations.

3.4. Example Process Flows

Figure 4C:
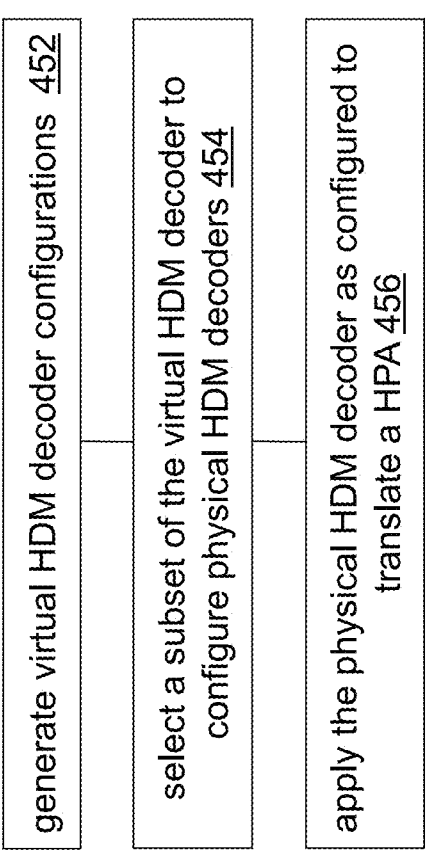

FIG. 4C illustrates an example process flow, according to an embodiment. The various elements of the flow described below may be performed with one or more computing devices (e.g., memory accelerator, non-host computing device, host computing device, etc.).

Block 452 comprises generating a total number V (where V>=2) of virtual host-managed device memory (HDM) decoder configurations for the same total number V of HDM memory regions attached to a non-host computing device. Each virtual HDM decoder configuration in the virtual HDM decoder configurations corresponds to a respective HDM memory region in the HDM memory regions.

Block 454 comprises selecting a proper subset of one or more virtual HDM decoder configurations from among the virtual HDM decoder configurations to configure one or more physical HDM decoders of a total number P (where P<V) of the non-host computing device into one or more virtual HDM decoders.

Block 456 comprises applying the one or more physical HDM decoders configured as one or more virtual HDM decoders to translate a host physical address (HPA) received from a host computing device in a memory access transaction involving the host computing device and the non-host computing device.

In an embodiment, each virtual HDM decoder configuration in the one or more virtual HDM decoder configurations is used to configure a respective physical HDM decoder in the one or more physical HDM decoders into a respective virtual HDM decoder in the one or more virtual HDM decoders.

In an embodiment, the one or more virtual HDM decoder configurations are selected from among the virtual HDM decoder configurations based on a non-prediction-based virtual HDM decoder selection algorithm.

In an embodiment, the one or more virtual HDM decoder configurations are selected from among the virtual HDM decoder configurations based on a prediction-based virtual HDM decoder selection algorithm.

In an embodiment, the prediction-based virtual HDM decoder selection algorithm uses a temporal or spatial distribution of previously translated HPAs to predict that the one or more virtual HDM decoders are more likely, among a total number V of virtual HDM decoders, to generate a hit for the HPA.

In an embodiment, the method further comprises: in response to determining that the one or more physical HDM decoders configured as one or more virtual HDM decoders generate no hit for the HPA, performing: selecting a second proper subset of one or more second virtual HDM decoder configurations from among the virtual HDM decoder configurations to configure the one or more physical HDM decoders into one or more second virtual HDM decoders; applying the one or more physical HDM decoders configured as one or more second virtual HDM decoders to translate the HPA.

In an embodiment, the method further comprises: in response to determining that the one or more physical HDM decoders configured as one or more virtual HDM decoders generate a single hit of a device physical address (DPA) for the HPA, causing a specific HDM memory region, among the HDM memory regions, referenced by the DPA to be accessed as a part of the memory access transaction.

In an embodiment, in response to an HDM decoding error in a HDM memory read transaction, a poison bit is indicated with data sent to the host computing device; in response to an HDM decoding error in a HDM memory write transaction, the error is logged by the non-host computing device.

In an embodiment, a computing device such as a server, one or more computing processors or chips or chipsets on a server board, etc., is configured to perform any of the foregoing methods. In an embodiment, an apparatus comprises a processor and is configured to perform any of the foregoing methods. In an embodiment, a non-transitory computer readable storage medium, storing software instructions, which when executed by one or more processors cause performance of any of the foregoing methods.

In an embodiment, a computing device comprising one or more processors and one or more storage media storing a set of instructions which, when executed by the one or more processors, cause performance of any of the foregoing methods.

Note that, although separate embodiments are discussed herein, any combination of embodiments and/or partial embodiments discussed herein may be combined to form further embodiments.

4.0. Implementation Mechanism-Hardware Over View

According to one embodiment, the techniques described herein are implemented by one or more special-purpose computing devices. The special-purpose computing devices may be desktop computer systems, portable computer systems, handheld devices, networking devices, or any other device that incorporates hard-wired and/or program logic to implement the techniques. The special-purpose computing devices may be hard-wired to perform the techniques, or may include digital electronic devices such as one or more application-specific integrated circuits (ASICs) or field programmable gate arrays (FPGAs) that are persistently programmed to perform the techniques. Such special-purpose computing devices may also combine custom hard-wired logic, ASICs, FPGAs, or other circuitry with custom programming to accomplish the techniques.

Though certain foregoing techniques are described with respect to a hardware implementation, which provides a number of advantages in certain embodiments, it will also be recognized that, in other embodiments, the foregoing techniques may still provide certain advantages when performed partially or wholly in software. Accordingly, in such an embodiment, a suitable implementing apparatus comprises a general-purpose hardware processor and is configured to perform any of the foregoing methods by executing program instructions in firmware, memory, other storage, or a combination thereof.

Figure 5:
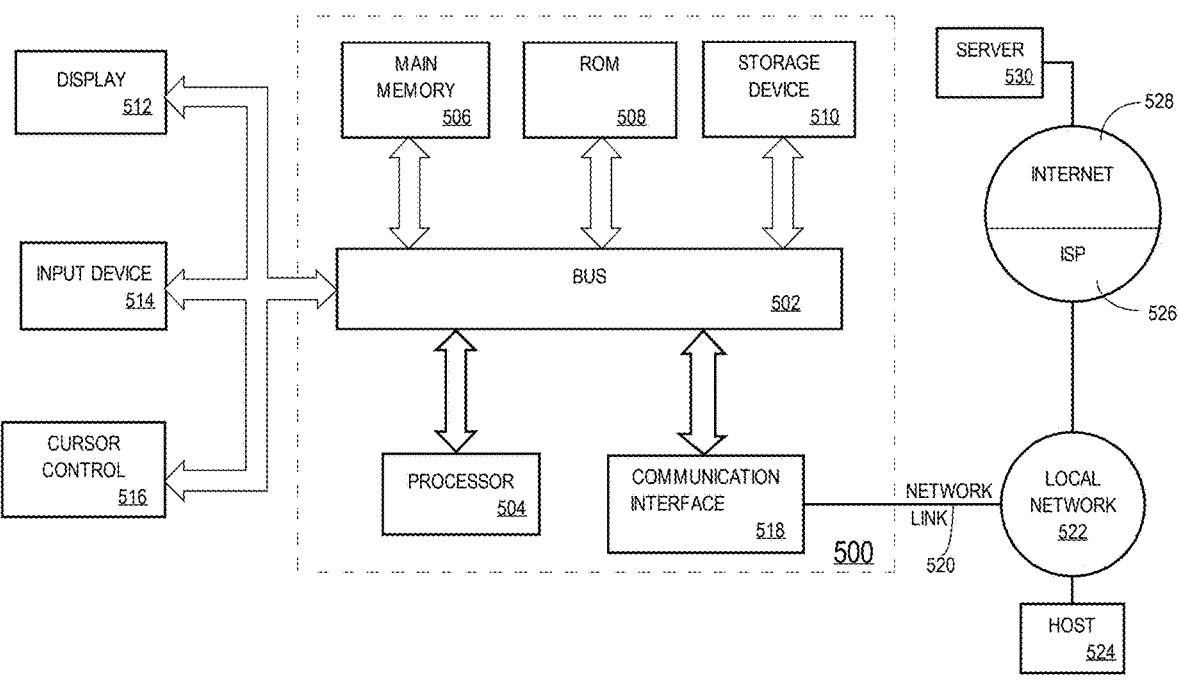
FIG. 5 is block diagram of a computer system upon which embodiments of the inventive subject matter may be implemented.

FIG. 5 is a block diagram that illustrates a computer system 500 that may be utilized in implementing the above-described techniques, according to an embodiment. Computer system 500 may be, for example, a desktop computing device, laptop computing device, tablet, smartphone, server appliance, computing mainframe, multimedia device, handheld device, networking apparatus, or any other suitable device. In an embodiment, FIG. 5 is a different view of the devices and systems described in previous sections.

Computer system 500 may include one or more ASICs, FPGAs, or other specialized circuitry 503 for implementing program logic as described herein. For example, circuitry 503 may include fixed and/or configurable hardware logic blocks for implementing some or all of the described techniques, input/output (I/O) blocks, hardware registers or other embedded memory resources such as random-access memory (RAM) for storing various data, and so forth. The logic blocks may include, for example, arrangements of logic gates, flip-flops, multiplexers, and so forth, configured to generate an output signals based on logic operations performed on input signals.

Additionally, and/or instead, computer system 500 may include one or more hardware processors 504 configured to execute software-based instructions. Computer system 500 may also include one or more busses 502 or other communication mechanism for communicating information. Busses 502 may include various internal and/or external components, including, without limitation, internal processor or memory busses, a Serial ATA bus, a PCI Express bus, a Universal Serial Bus, a HyperTransport bus, an Infiniband bus, and/or any other suitable wired or wireless communication channel.

Computer system 500 also includes one or more memories 506, such as a RAM, hardware registers, or other dynamic or volatile storage device for storing data units to be processed by the one or more ASICs, FPGAs, or other specialized circuitry 503. Memory 506 may also or instead be used for storing information and instructions to be executed by processor 504. Memory 506 may be directly connected or embedded within circuitry 503 or a processor 504. Or, memory 506 may be coupled to and accessed via bus 502. Memory 506 also may be used for storing temporary variables, data units describing rules or policies, or other intermediate information during execution of program logic or instructions.

Computer system 500 further includes one or more read only memories (ROM) 508 or other static storage devices coupled to bus 502 for storing static information and instructions for processor 504. One or more storage devices 510, such as a solid-state drive (SSD), magnetic disk, optical disk, or other suitable non-volatile storage device, may optionally be provided and coupled to bus 502 for storing information and instructions.

A computer system 500 may also include, in an embodiment, one or more communication interfaces 515 coupled to bus 502. A communication interface 518 provides a data communication coupling, typically two-way, to a network link 520 that is connected to a local network 522. For example, a communication interface 518 may be an integrated services digital network (ISDN) card, cable modem, satellite modem, or a modem to provide a data communication connection to a corresponding type of telephone line. As another example, the one or more communication interfaces 518 may include a local area network (LAN) card to provide a data communication connection to a compatible LAN. As yet another example, the one or more communication interfaces 518 may include a wireless network inter-face controller, such as a 802.11-based controller, Bluetooth controller, Long Term Evolution (LTE) modem, and/or other types of wireless interfaces. In any such implementation, communication interface 518 sends and receives electrical, electromagnetic, or optical signals that carry digital data streams representing various types of information.

Network link 520 typically provides data communication through one or more networks to other data devices. For example, network link 520 may provide a connection through local network 522 to a host computer 524 or to data equipment operated by a Service Provider 526. Service Provider 526, which may for example be an Internet Service Provider (ISP), in turn provides data communication services through a wide area network, such as the world-wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

In an embodiment, computer system 500 can send packets and receive data through the network(s), network link 520, and communication interface 518. In some embodiments, this data may be data units that the computer system 500 has been asked to process and, if necessary, redirect to other computer systems via a suitable network link 520. In other embodiments, this data may be instructions for implementing various processes related to the described techniques. For instance, in the Internet example, a server 530 might transmit a requested code for an application program through Internet 528, ISP 526, local network 522 and communication interface 518. The received code may be executed by processor 504 as it is received, and/or stored in storage device 510, or other non-volatile storage for later execution. As another example, information received via a network link 520 may be interpreted and/or processed by a software component of the computer system 500, such as a web browser, application, or server, which in turn issues instructions based thereon to a processor 504, possibly via an operating system and/or other intermediate layers of software components.

Computer system 500 may optionally be coupled via bus 502 to one or more displays 512 for presenting information to a computer user. For instance, computer system 500 may be connected via a High-Definition Multimedia Interface (HDMI) cable or other suitable cabling to a Liquid Crystal Display (LCD) monitor, and/or via a wireless connection such as peer-to-peer Wi-Fi Direct connection to a Light-Emitting Diode (LED) television. Other examples of suitable types of displays 512 may include, without limitation, plasma display devices, projectors, cathode ray tube (CRT) monitors, electronic paper, virtual reality headsets, braille terminal, and/or any other suitable device for outputting information to a computer user. In an embodiment, any suitable type of output device, such as, for instance, an audio speaker or printer, may be utilized instead of a display 512.

One or more input devices 514 are optionally coupled to bus 502 for communicating information and command selections to processor 504. One example of an input device 514 is a keyboard, including alphanumeric and other keys. Another type of user input device 514 is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane. Yet other examples of suitable input devices 514 include a touch-screen panel affixed to a display 512, cameras, microphones, accelerometers, motion detectors, and/or other sensors. In an embodiment, a network-based input device 514 may be utilized. In such an embodiment, user input and/or other information or commands may be relayed via routers and/or switches on a Local Area Network (LAN) or other suitable shared network, or via a peer-to-peer network, from the input device 514 to a network link 520 on the computer system 500.

As discussed, computer system 500 may implement techniques described herein using customized hard-wired logic, one or more ASICs or FPGAs 503, firmware and/or program logic, which in combination with the computer system causes or programs computer system 500 to be a special-purpose machine. According to one embodiment, however, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and use a modem to send the instructions over a network, such as a cable network or cellular network, as modulated signals. A modem local to computer system 500 can receive the data on the network and demodulate the signal to decode the transmitted instructions. Appropriate circuitry can then place the data on bus 502. Bus 502 carries the data to main memory 506, from which processor 504 retrieves and executes the instructions. The instructions received by main memory 506 may optionally be stored on storage device 510 either before or after execution by processor 504.

5.0. Extensions and Alternatives

As used herein, the terms "first," "second," "certain," and "particular" are used as naming conventions to distinguish queries, plans, representations, steps, objects, devices, or other items from each other, so that these items may be referenced after they have been introduced. Unless otherwise specified herein, the use of these terms does not imply an ordering, timing, or any other characteristic of the referenced items.

In the drawings, the various components are depicted as being communicatively coupled to various other components by arrows. These arrows illustrate only certain examples of information flows between the components. Neither the direction of the arrows nor the lack of arrow lines between certain components should be interpreted as indicating the existence or absence of communication between the certain components themselves. Indeed, each component may feature a suitable communication interface by which the component may become communicatively coupled to other components as needed to accomplish any of the functions described herein.

In the foregoing specification, embodiments of the inventive subject matter have been described with reference to numerous specific details that may vary from implementation to implementation. Thus, the sole and exclusive indicator of what is the inventive subject matter, and is intended by the applicants to be the inventive subject matter, is the set of claims that issue from this application, in the specific form in which such claims issue, including any subsequent correction. In this regard, although specific claim dependencies are set out in the claims of this application, it is to be noted that the features of the dependent claims of this application may be combined as appropriate with the features of other dependent claims and with the features of the independent claims of this application, and not merely according to the specific dependencies recited in the set of claims. Moreover, although separate embodiments are discussed herein, any combination of embodiments and/or partial embodiments discussed herein may be combined to form further embodiments.

Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

The invention claimed is:

1. A method comprising:
   collecting a history of device physical addresses (DPAs) in prior memory accesses involving a host computing device to a non-host computing device;
   using locality information of the DPAs in the history of DPAs to select one or more virtual host-managed device memory (HDM) decoder configurations of a total number P, from among a total number V (where V>=2) of virtual HDM decoder configurations, to configure one or more physical HDM decoders of the total number P (where 0<P<V) of the non-host computing device into one or more virtual HDM decoders;
   applying the one or more physical HDM decoders configured as the one or more virtual HDM decoders to translate a host physical address (HPA) received from the host computing device into a corresponding DPA in a memory access transaction involving the host computing device and the non-host computing device.

2. The method of claim 1, wherein each virtual HDM decoder configuration in the one or more virtual HDM decoder configurations is used to configure a respective physical HDM decoder in the one or more physical HDM decoders into a respective virtual HDM decoder in the one or more virtual HDM decoders.

3. The method of claim 1, where the one or more virtual HDM decoder configurations are selected from among the virtual HDM decoder configurations based on an order predicted in part from one or both of spatial locality information and temporal locality information in the locality information of the DPAs in the history of DPAs.

4. The method of claim 1, wherein the one or more virtual HDM decoder configurations are selected by a prediction-based virtual HDM decoder selection algorithm that uses a distribution of previously translated HPAs to predict that the one or more virtual HDM decoders are more likely, among a total number V of virtual HDM decoders, to generate a hit for the HPA.

5. The method of claim 1, further comprising:
in response to determining that the one or more physical HDM decoders configured as one or more virtual HDM decoders generate no hit for the HPA, performing:
selecting one or more second virtual HDM decoder configurations from among the virtual HDM decoder configurations to configure the one or more physical HDM decoders into one or more second virtual HDM decoders;
applying the one or more physical HDM decoders configured as one or more second virtual HDM decoders to translate the HPA.

6. The method of claim 1, further comprising: in response to determining that the one or more physical HDM decoders configured as one or more virtual HDM decoders generate a single hit of a device physical address (DPA) for the HPA, causing a specific HDM memory region, among the HDM memory regions, referenced by the DPA to be accessed as a part of the memory access transaction.

7. The method of claim 1, wherein, in response to an HDM decoding error in a HDM memory read transaction, a poison bit is indicated with data sent to the host computing device; wherein, in response to an HDM decoding error in a HDM memory write transaction, the error is logged by the non-host computing device.

8. A computing device comprising:
one or more computing processors;
one or more non-transitory computer readable storage media, comprising instructions, which when executed by one or more computing processors cause the one or more computing processors to perform:
collecting a history of device physical addresses (DPAs) in prior memory accesses involving a host computing device to a non-host computing device;
using locality information of the DPAs in the history of DPAs to select one or more virtual host-managed device memory (HDM) decoder configurations of a total number P, from among a total number V (where V>=2) of virtual HDM decoder configurations, to configure one or more physical HDM decoders of the total number P (where 0<P<V) of the non-host computing device into one or more virtual HDM decoders;
applying the one or more physical HDM decoders configured as the one or more virtual HDM decoders to translate a host physical address (HPA) received from the host computing device into a corresponding DPA in a memory access transaction involving the host computing device and the non-host computing device.

9. The computing device of claim 8, wherein each virtual HDM decoder configuration in the one or more virtual HDM decoder configurations is used to configure a respective physical HDM decoder in the one or more physical HDM decoders into a respective virtual HDM decoder in the one or more virtual HDM decoders.

10. The computing device of claim 8, where the one or more virtual HDM decoder configurations are selected from among the virtual HDM decoder configurations based on an order predicted in part from one or both of spatial locality information and temporal locality information in the locality information of the DPAs in the history of DPAs.

11. The computing device of claim 8, wherein the one or more virtual HDM decoder configurations are selected by a prediction-based virtual HDM decoder selection algorithm that uses a distribution of previously translated HPAs to predict that the one or more virtual HDM decoders are more likely, among a total number V of virtual HDM decoders, to generate a hit for the HPA.

12. The computing device of claim 8, wherein the instructions, which when executed by the one or more computing processors cause the one or more computing processors to further perform:
in response to determining that the one or more physical HDM decoders configured as one or more virtual HDM decoders generate no hit for the HPA, performing:
selecting one or more second virtual HDM decoder configurations from among the virtual HDM decoder configurations to configure the one or more physical HDM decoders into one or more second virtual HDM decoders;
applying the one or more physical HDM decoders configured as one or more second virtual HDM decoders to translate the HPA.

13. The computing device of claim 8, wherein the instructions, which when executed by the one or more computing processors cause the one or more computing processors to further perform: in response to determining that the one or more physical HDM decoders configured as one or more virtual HDM decoders generate a single hit of a device physical address (DPA) for the HPA, causing a specific HDM memory region, among the HDM memory regions, referenced by the DPA to be accessed as a part of the memory access transaction.

14. The computing device of claim 8, wherein, in response to an HDM decoding error in a HDM memory read transaction, a poison bit is indicated with data sent to the host computing device; wherein, in response to an HDM decoding error in a HDM memory write transaction, the error is logged by the non-host computing device.

15. One or more non-transitory computer readable storage media, comprising instructions, which when executed by one or more computing processors cause the one or more computing processors to perform:
collecting a history of device physical addresses (DPAs) in prior memory accesses involving a host computing device to a non-host computing device;
using locality information of the DPAs in the history of DPAs to select one or more virtual host-managed device memory (HDM) decoder configurations of a total number P, from among a total number V (where V>=2) of virtual HDM decoder configurations, to configure one or more physical HDM decoders of the total number P (where 0<P<V) of the non-host computing device into one or more virtual HDM decoders;
applying the one or more physical HDM decoders configured as the one or more virtual HDM decoders to translate a host physical address (HPA) received from the host computing device into a corresponding DPA in a memory access transaction involving the host computing device and the non-host computing device.

16. The media of claim 15, wherein each virtual HDM decoder configuration in the one or more virtual HDM decoder configurations is used to configure a respective physical HDM decoder in the one or more physical HDM decoders into a respective virtual HDM decoder in the one or more virtual HDM decoders.

17. The media of claim 15, where the one or more virtual HDM decoder configurations are selected from among the virtual HDM decoder configurations based on an order predicted in part from one or both of spatial locality information and temporal locality information in the locality information of the DPAs in the history of DPAs.

18. The media of claim 15, wherein the one or more virtual HDM decoder configurations are selected by a prediction-based virtual HDM decoder selection algorithm that uses a distribution of previously translated HPAs to predict that the one or more virtual HDM decoders are more likely, among a total number V of virtual HDM decoders, to generate a hit for the HPA.

19. The media of claim 15, wherein the instructions, which when executed by the one or more computing processors cause the one or more computing processors to further perform:

in response to determining that the one or more physical HDM decoders configured as one or more virtual HDM decoders generate no hit for the HPA, performing:

selecting one or more second virtual HDM decoder configurations from among the virtual HDM decoder configurations to configure the one or more physical HDM decoders into one or more second virtual HDM decoders;

applying the one or more physical HDM decoders configured as one or more second virtual HDM decoders to translate the HPA.

20. The media of claim 15, wherein the instructions, which when executed by the one or more computing processors cause the one or more computing processors to further perform: in response to determining that the one or more physical HDM decoders configured as one or more virtual HDM decoders generate a single hit of a device physical address (DPA) for the HPA, causing a specific HDM memory region, among the HDM memory regions, referenced by the DPA to be accessed as a part of the memory access transaction.

21. The media of claim 15, wherein, in response to an HDM decoding error in a HDM memory read transaction, a poison bit is indicated with data sent to the host computing device; wherein, in response to an HDM decoding error in a HDM memory write transaction, the error is logged by the non-host computing device.

* * * * *